Oct. 4, 1955 M. KARNAUGH 2,719,773

ELECTRICAL CIRCUIT EMPLOYING MAGNETIC CORES

Filed Nov. 20, 1953 3 Sheets-Sheet 1

INVENTOR
M. KARNAUGH
BY James J. Falk
ATTORNEY

Oct. 4, 1955 M. KARNAUGH 2,719,773

ELECTRICAL CIRCUIT EMPLOYING MAGNETIC CORES

Filed Nov. 20, 1953 3 Sheets-Sheet 2

INVENTOR
M. KARNAUGH
BY
James W. Falk
ATTORNEY

INVENTOR
M. KARNAUGH
BY James W. Falk
ATTORNEY

United States Patent Office 2,719,773

Patented Oct. 4, 1955

2,719,773

ELECTRICAL CIRCUIT EMPLOYING MAGNETIC CORES

Maurice Karnaugh, New Providence, N. J., assignor to Bell Telephone Laboratories, Incorporated, New York, N. Y., a corporation of New York Application November 20, 1953, Serial No. 393,399

12 Claims. (Cl. 346—74)

This invention relates to electrical circuits employing magnetic cores and more particularly to pulse switching circuits.

In electrical circuits it is often desirable to apply a current pulse to one of a number of possible loads in response to an activating pulse, the particular one of the loads being determined by information stored in the circuit or in associated circuitry. This is a generalized pulse switching problem and various circuits have been developed to resolve it, these circuits including gas tubes, vacuum tubes, multivibrator or trigger circuits, diode matrices, etc.

It is a general object of this invention to provide improved and simpler pulse switching circuits.

More specifically it is an object of this invention to provide improved pulse switching circuits employing magnetic devices.

Magnetic devices of the type here comprehended generally comprise a plurality of windings on a core of a magnetic material having a substantially rectangular hysteresis loop. Such materials are known in the art and may include certain ferrites, such as the General Ceramics MF1118 Ferramic material, Deltamax, a grain orienter 50 per cent nickel iron alloy of the Allegheny Ludlum Steel Company, 4–79 molybdenum permalloy, supermalloy, and other materials.

In accordance with one aspect of this invention, each of the cores in the circuit includes at least one input or set winding, an activating winding, and an output winding, the activating windings of all cores being connected in series and the output windings being connected in parallel to the last of the activating windings.

Each core is normally at one point on its hysteresis loop, at which point no information is stored in the core. When it is desired to switch the activating pulse to any particular load connected to one output winding, information or input pulses are applied to the input windings of all other cores to store this information in those cores. This storage is accomplished by reversing the polarity or the direction of the magnetization in those cores. Then on application of the activating pulse through each of the activating windings in series, the magnetization in all but this one core will be shifted back by the activation pulse and a counter or back electromotive force will be developed across the output windings of those cores preventing the activating pulse from flowing through those output windings and forcing the entire activating pulse current through the output winding of the one core to which information or input pulses had not been applied.

In one specific illustrative embodiment of this invention wherein the pulse switching circuit comprises only two cores in a writing circuit for changing the flux condition on a magnetic surface, such as a magnetic drum, the output loads comprise two coils on a single magnetic writing head, the coils being oppositely wound so that current flowing through one coil will change the flux condition of the magnetic surface in one direction and current flowing through the other coil will change the flux condition of the magnetic surface in the other direction.

It is therefore another object of this invention to provide an improved circuit for writing on a magnetic surface.

It is a feature of this invention that an electrical circuit comprise a number of magnetic cores each having input, activating, and output windings, the activating windings being connected in series and the output windings being connected in parallel to the last of the activating windings so that an activating current pulse can be directed to a particular one of the output windings due to the information stored in the cores by application of input or information pulses to the input windings.

It is a further feature of this invention that the electromotive force developed on an output winding of a core whose magnetic condition had been priorly set by application of an input pulse to the set winding of that core be such as to prevent passage of the activating pulse through that output winding.

It is a still further feature of specific embodiments of this invention employable as magnetic surface writing circuits that the loads connected to the output windings of two magnetic cores comprise two coils of a magnetic writing head so wound that current flowing through the coils individually will cause the magnetic flux condition of the surface beneath the head to change in opposite directions and current flowing through the two coils simultaneously will have no effect on the magnetic condition of the surface area directly beneath the magnetic head.

It is another feature of this invention that spurious output pulses on the continued application of the pulse to the series connected activating windings are prevented in specific embodiments of this invention by the inclusion in the circuit of another magnetic core whose activating winding is connected in series with the activating windings of the other cores but whose output winding is connected through a unidirectional current element to ground.

It is still another feature of certain embodiments of this invention that more than one output winding be on certain of the cores thus providing alternate parallel paths for the activating pulse dependent on the condition of a prior magnetic core in the circuit.

A complete understanding of this invention and of the various features thereof may be gained from consideration of the following detailed description and the accompanying drawing, in which.

Figure 4:
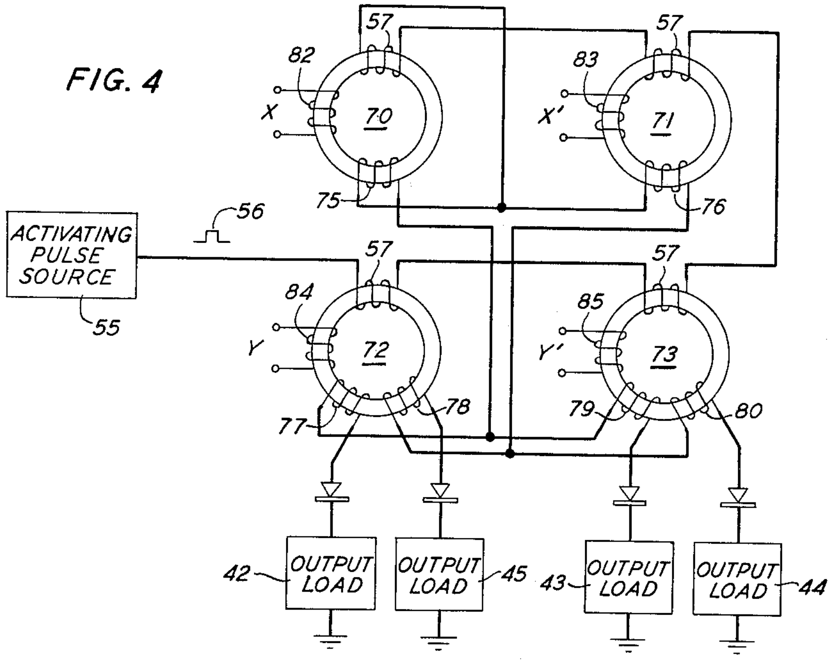
Figure 5:
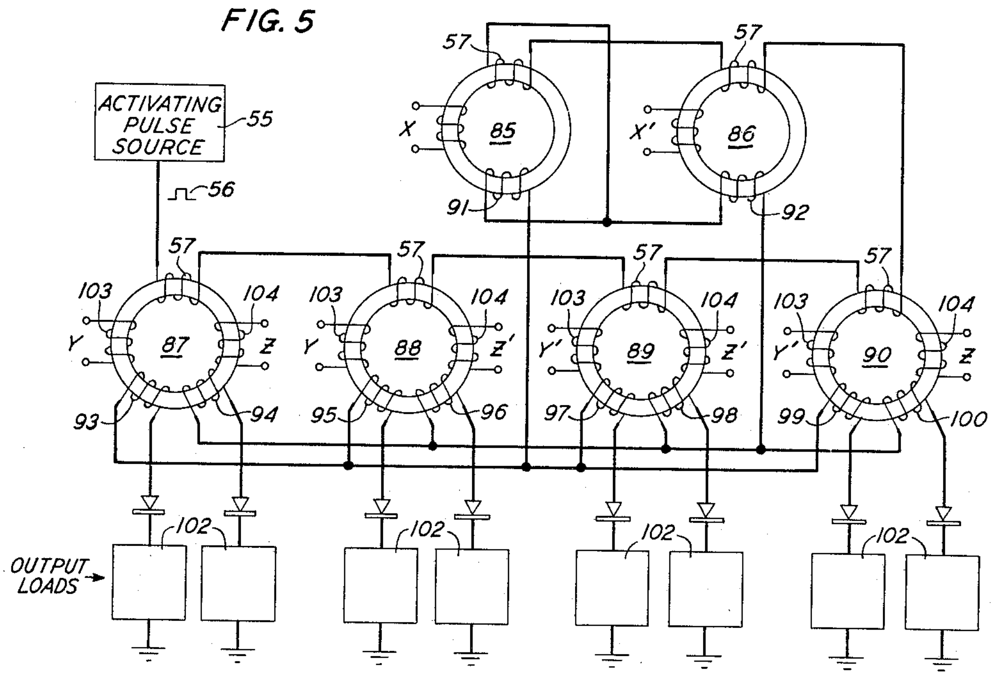

Fig. 4 is a schematic representation of another illustrative embodiment of this invention wherein a single pulse may be switched to any one of four output loads in accordance with a particular function of two input variables; and Fig. 5 is a schematic representation of still another illustrative embodiment of this invention wherein a single pulse may be switched to any of eight output loads in accordance with a particular function of three input variables.

Figures 1, 2:
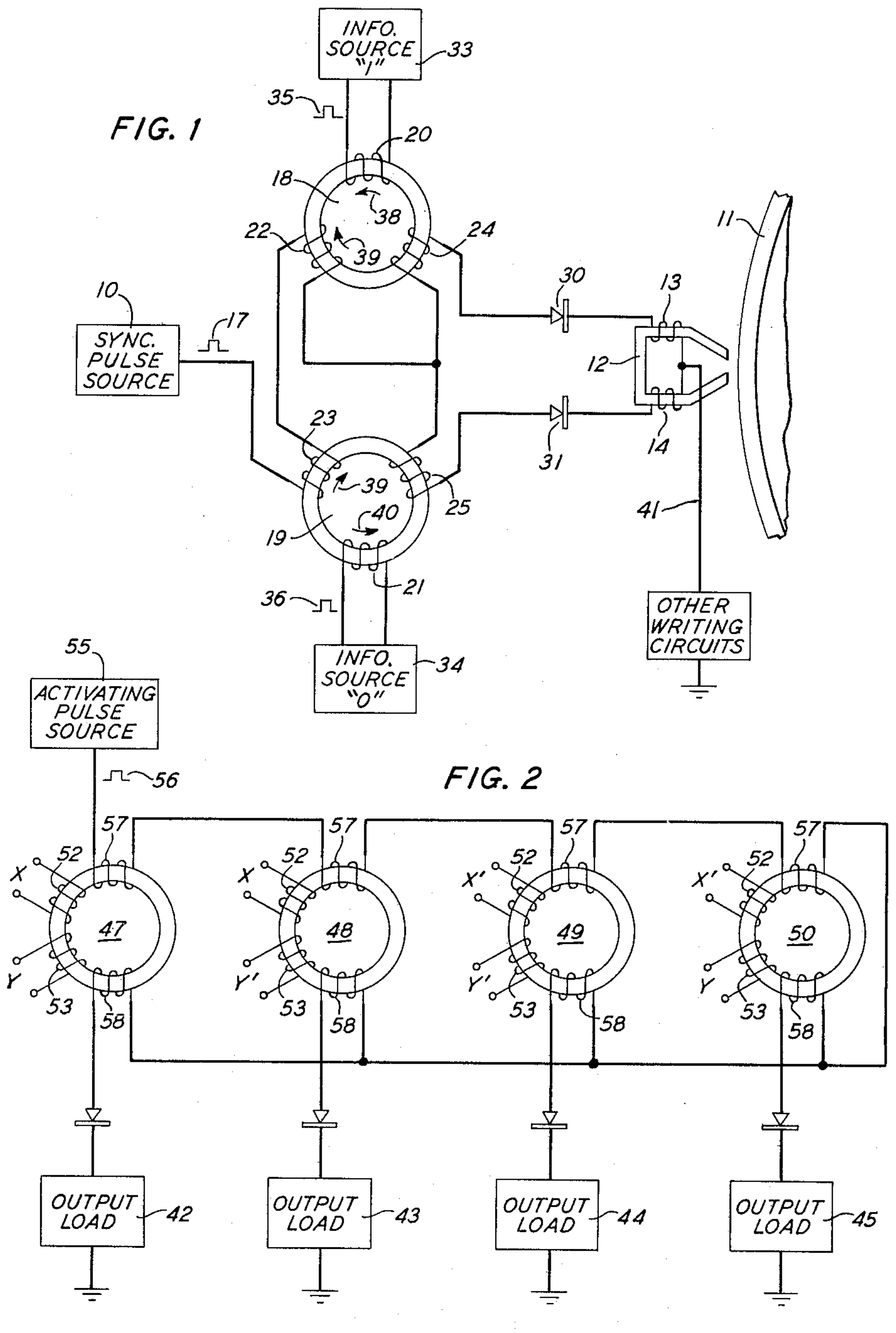
Fig. 1 is a schematic representation of an illustrative embodiment of this invention wherein two magnetic cores are employed in a writing circuit for a magnetizable surface.
Fig. 2 is a schematic representation of another illustrative embodiment of this invention wherein a single pulse may be switched to any of four output loads in accordance with a particular function of two input variables.

Turning now to the drawing, Fig. 1 depicts one illustrative embodiment of this invention comprising a writing circuit. Advantageously a number of these circuits are connected in series so that a single synchronous pulse source 10 can provide the requisite power pulse for the writing of a "1" or a "0" on a number of cells or spots on a magnetic surface 11 at one time. The magnetic surface 11 may be the surface of a magnetic drum or other moving magnetic surface, as is known in the art. Adjacent surface 11 are one or more magnetic heads 12 having a pair of coils 13 and 14 thereon. The magnetic head 12 is in close proximity to the magnetic surface 11 and serves to change the flux condition of a discrete area of the surface when current flows through either of the coils 13 or 14. The coils 13 and 14 are wound in opposite directions so that current flowing through the windings will tend to magnetize the surface 11 in opposite directions.

The writing of a "1" or a "0" on a cell on the magnetic surface 11 is therefore attained by appropriate switching of the activating pulse 17 from the synchronous pulse source 10 to either of the coils 13 or 14. In accordance with an aspect of this invention, this pulse switching is accomplished by a pair of magnetic cores 18 and 19 each of which has at least one input or set winding 20 and 21, an activating winding 22 and 23, and an output winding 24 and 25. As can be seen in the drawing and in accordance with a feature of this invention, the activating windings 22 and 23 are connected in series and the output windings 24 and 25 are connected in parallel to the second of the activating windings. The coil 13 is connected, by a diode or other unidirectional element 30, to the output winding 24 and constitutes the load of that winding and the coil 14 is similarly connected to the output winding 25 by a diode or other unidirectional element 31 and constitutes the load of that winding.

The switching of the activating pulse 17 is dependent on the information inputs to the set windings 20 and 21 from information sources 33 and 34. Information source 33 is assumed to apply a set pulse 35 when a "1" is to be written on the cell on the magnetic surface 11 and information source 34 is assumed to apply a set pulse 36 when a "0" is to be written on the cell. These sources may advantageously include the associated circuitry of the system in which this writing circuit is to be employed for controlling the writing of either a "1" or a "0" on the cell on the drum; examples of such circuitry may be found, inter alia, in the common control telephone system described in application Serial No. 340,471, filed March 5, 1953, of W. A. Malthaner and H. E. Vaughan. Other types of control circuits are known in the art.

When there has been no input pulse 35 or 36 to either core 18 or 19, then the activating current pulse 17 from pulse source 10 will flow through the two activating windings 22 and 23 in series, causing no change in the flux condition of the cores, and will divide through the output windings 24 and 25 and non-inductively through the two equal coils 13 and 14 of the writing head 12. Pulse source 10 may include the associated circuitry which determines that the head 12 has access to the appropriate cell on the magnetic surface 11, assures that the writing of information on all cells occurs in synchronism, and operates only when advised that the system sequence or programming desires the information to be written. Examples of the type of circuitry that may be included in the pulse source 27 and the conditions of its operations may also be found, inter alia, in the telephone system disclosed in the above-mentioned Malthaner-Vaughan application, and other examples are known in the art.

However, if a pulse 35 has been applied to the set winding 20 of the core 18, a "1" or, we may consider, a "write 1" order has been stored in the magnetic core in the manner known in the art. We shall assume that the normal magnetization of the cores 18 and 19 is clockwise so that the application of the pulse 35 causes the core 18 to be magnetized in the counter-clockwise sense as indicated by the arrow 38 while the core 19 remains magnetized in a clockwise sense.

The activating pulse 17 applied to the activating windings 22 and 23 tends to magnetize the cores 18 and 19 in the clockwise direction, as indicated by the arrows 39. There will therefore be no significant flux change in core 19 which is already magnetized in the clockwise direction. However, core 18 will begin to switch its magnetization along its hysteresis loop, developing a back electromotive force across the output winding 24. By employing a sufficient number of turns on the winding 24, this back electromotive force is large enough to prevent any current flow through the winding 24 and thus through the coil 13 of the magnetic head 12. The entire current pulse 17 will therefore flow through the output winding 25 and through the coil 14.

It is therefore to be noted that the coil 13 connected to the output winding 24 of the "1" core 18, is the write "0" coil and conversely coil 14, connected to the output winding 25 of the "0" core 19, is the write "1" coil.

Similarly of course the application of an information pulse 36 to the set winding 21 of the core 19 will switch the magnetization of that core to the counterclockwise direction indicated by the arrow 40, and the subsequent application of the activating pulse 17 will reverse that direction of magnetization thereby causing the current pulse 17 to flow entirely through the write "0" coil 13 of the magnetic head 12.

The activating pulse 17 always returns the magnetic condition of the cores to their original state, which in this embodiment is a clockwise direction of magnetization, in preparation for the application of the next input pulse and thus the storage of the next write command. Further while advantageously in an embodiment of this invention as just described only one information pulse 35 or 36 would be applied in any write interval, that is during the time between successive activating pulse 17, if both information pulses are applied to the set windings, both cores will shift their magnetizations on application of the activating pulse, and again current will flow non-inductively through both of the coils 13 and 14.

The unidirectional current elements 30 and 31 prevent any flow of current from one output winding back through the other coil to the other output winding and they also prevent induced currents from circulating during the application of the input or information pulses 35 and 36. The coils 13 and 14 may be directly connected to ground or, as indicated, may be connected to other writing circuits, the lead 41 from the coils 13 and 14 being connected to the first activating winding of the next writing circuit.

The writing time includes the delay between the application of the activating pulse 17 and the commencement of the changing of the flux condition of the cell on the magnetic surface 11 and the time required for the blocking core to saturate. The activating pulse 17 may be slightly longer in duration than this time. The number of turns of the activating windings 22 and 23 and the amplitude of the applied current pulse 17 are major determining factors in the writing time. However, this writing time may be reduced to a very short value so that circuits in accordance with this invention can be utilized in those systems where it is required that the writing of information be accomplished with great rapidity.

While this invention has been depicted in Fig. 1 with respect to an embodiment wherein only one of two values of information is to be written by a single magnetic head on a magnetic surface, the invention is not to be considered as so limited but may be generalized to the case of the switching of a single activating pulse to one of any number of output loads. Thus in Fig. 2 there is depicted another illustrative embodiment of this invention wherein an output pulse is applied to one of four possible loads 42, 43, 44 and 45 in accordance with input information to four magnetic cores 47, 48, 49 and 50. Thus each core has a pair of input windings 52 and 53 which are connected to suitable information or input pulse sources, not shown, so that the input to windings 52 represent $x$ or $x'$ and the inputs to windings 53 represent $y$ or $y'$, as shown in the drawing.

A single activating pulse source 55 applies an activating current pulse 56 through each of the activating windings 57 in series and the output windings 58 in parallel. The output loads 42, 43, 44 and 45 are connected between the output windings 58 and ground.

The operation of this embodiment is similar to that of the embodiment of Fig. 1. Let us assume that it is desired to switch the activating pulse 56 to the output windings 58 and output load of core 48. The information pulse sources, not shown, will therefore apply to the windings 52 and 53 the negation of the values of the input windings on core 48 and thus input pulses will be applied from pulse source $x'$ and pulse source $y$. The input pulse $y$ applied to core 47 will reverse the magnetization in that core, the input pulse $x'$ will reverse the magnetization in core 49, and both pulses will serve to reverse the magnetization in core 50. Thus when the activation pulse 56 is applied to the windings 57, each of cores 47, 49 and 50 will be switched back to their original states of magnetization, the large resultant flux change inducing a counter electromotive force in the output windings 58 of these cores to force the entire activating pulse current to be applied to the output load 43, which load is connected to the output winding 58 of the core 48. It is therefore apparent that, in terms of Boolean algebra, the function represented by the load 43 is $f=x'y$, the product of the negatives of the values of the input windings.

Similarly the output loads 42, 44, and 45 represent the functions $f=x'y'$, $f=xy$, and $f=xy'$, respectively. Further by multiplying the output loads 42, 43, 44, and 45 any desired function of the two input variables may be attained. Additionally the number of input variables may be increased so that any desired logical function of $n$ input variables may be attained in a circuit in accordance with this aspect of the invention.

In the embodiment of Fig. 2 it is assumed that an information pulse will be applied prior to each activation pulse. As depicted, if this were not the case, current would be applied to all four output loads if no input pulses are applied to the cores.

In the circuit depicted in Fig. 2 it is advantageous to terminate the activating pulse 56 in the time it takes the cores to saturate as the continued application of the activating pulse would cause unwanted pulses to appear on the output leads. If it is inconvenient to do this due to uncertainties as to the time required for saturation, etc. the same result may readily be attained in accordance with an aspect of this invention depicted in Fig. 3 wherein the circuit of Fig. 2 has been modified by the addition of a fifth magnetic core 60 whose activating winding 57 is also connected in series with the activating winding 57 of the prior cores and whose output winding 58 is similarly connected in parallel with the output windings of the prior cores. However, the output winding of core 60 is not connected to any load circuit but instead is connected directly to ground through a diode or other unidirectional current element 61, and only a single input or set winding 63 is employed. A source of pulses 64 is connected to this winding 63 and so arranged that whenever any information input is applied to a winding 52 or 53 of the prior cores, an information pulse is applied to the winding 63. If information pulses are applied to windings 52 and 53 in a definite time sequence, source 64 may be a source of clock pulses appearing in synchronism with this time sequence.

Core 60 will therefore always have its magnetization shifted by the activating pulse 56 and thus there will never be an output pulse through output winding 58 on this core due to shifting of the other cores when no information has been stored in core 60, in the manner described above with reference to the operation of Figs.

1 and 2. However after core 60 has saturated due to the presence of the activating pulse 56, the output winding 58 of this core will be effectively directly connected to ground so that any activating pulse current applied after this time will be shorted to ground through this winding and will not appear as unwanted pulses at any of the loads.

Figure 3:
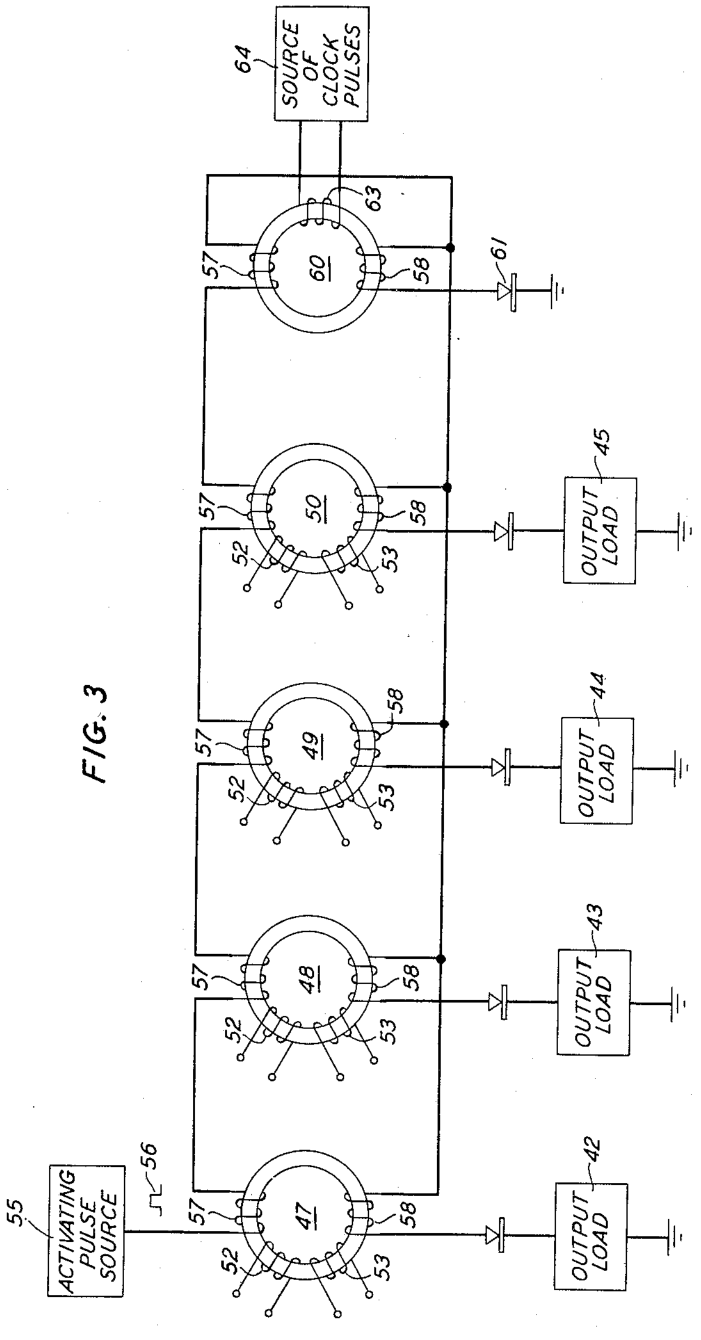
Fig. 3 is a schematic representation of a modification of the embodiment of this invention depicted in Fig. 2.

In the circuits of Figs. 2 and 3 two set windings 52 and 53 are utilized on each core in order to attain an output indicative of any one of the four possible combinations of the four input variables. In the embodiment of this invention depicted in Fig. 4, this is attained with only one set winding on each of the four cores 70, 71, 72, and 73 of that circuit. However two of the cores 72 and 73 each have two output windings. In this circuit the activating pulse 56 is applied to the four activating windings 57 in series and then to either of the two output windings 75 and 76 depending on whether input variable $x$ or $x'$ had been applied to this circuit. If input variable $x$ had been applied to the set winding 82, the activating pulse is forced through output winding 76 and through either output winding 80 or 78, depending on whether input variable $y$ or $y'$ had been applied to the set windings 84 or 85, respectively. Similarly if input variable $x'$ had been applied to set winding 83, the activating pulse would have been forced through either output winding 77 or 79. The output loads 42, 43, 44, and 45 thus represent the same functions as priorly described with respect to Fig. 2.

In the specific embodiment of Fig. 5 certain advantageous features of both Figs. 2 and 4 are combined so that any one of the possible eight functions of three variables, corresponding to the eight output loads 102, can be determined by employing six magnetic cores 85, 86, 87, 88, and 90. In this embodiment the activating pulse 56 after passing through the six activating windings 57 in series is directed through either output windings 91 or 92, depending on the value of the variable $x$, and then through any one of the four cores 87, 88, 89 or 90 each having two input windings 103 and 104 determining the choice of the output load as described above in regard to Fig. 2.

It should be noted that the illustrative embodiment of either Fig. 4 or 5 may be modified as shown in Fig. 3 to assure that no unwanted and spurious output pulses are applied due to the presence of the activating pulse 57 after the change in magnetization of the magnetic cores because of the application of that pulse.

A circuit in accordance with the embodiment of this invention depicted in Fig. 2 in general utilizes $2^n$ cores for $n$ input variables whereas a circuit in accordance with the embodiment depicted in Fig. 4 utilizes only $2n$ cores for $n$ input variables. A circuit in accordance with the embodiment depicted in Fig. 5 would use a number of cores between $2n$ and $2^n$ depending on the particular combination of the circuit.

Reference is made to application Serial No. 393,388, filed November 20, 1953, of J. H. McGuigan and H. E. Vaughan wherein a related magnetic surface writing circuit employing magnetic cores is disclosed.

It is to be understood that the above-described arrangements are merely illustrative of the application of the principles of the invention. Numerous other arrangements may be devised by those skilled in the art without departing from the spirit and scope of the invention.

What is claimed is:

1. An electrical circuit comprising a plurality of magnetic cores, a plurality of windings on each of said cores, said windings including a set winding, an activating winding, and an output winding, means connecting the activating windings in series, and means connecting one end of the output windings to the last of said series activating windings.

2. An electrical circuit comprising a plurality of magnetic cores each having a number of windings thereon, said windings including a set winding, an activating winding, and an output winding, said activating windings being connected in series and one end of each of said output windings being connected to the last of said series activating windings, means including said set windings for determining the magnetization of certain of said cores in one direction, and means for applying an activating pulse to said activating windings in series to determine the magnetization of said cores in the other direction.

3. An electrical circuit comprising at least two magnetic cores each having an initial state of magnetization, a number of windings on each of said cores, said windings including a set winding, an activating winding and an output winding, said activating windings being connected in series and one end of each of said output windings being connected to the last of said series activating windings, load means individually connected to the other end of each of said output windings, means including said set windings for reversing the state of magnetization of certain of said cores, and means for applying an activating pulse to said activating windings in series to restore the initial state of magnetization in said certain cores, whereby a counterelectromotive force is induced in said output windings of said certain cores and said activating pulse is applied only to the load means connected to said output windings of the cores other than said certain cores.

4. An electrical circuit comprising a plurality of magnetic cores each having an initial state of magnetization, a set, an activating, and an output winding on each of said cores, said activating windings being connected in series and one end of each of said output windings being connected to the last of said series activating windings, load means connected to the other end of each of said output windings and means for applying a current pulse to each of said load means in accordance with a particular condition, said last mentioned means comprising means including said set windings for determining the magnetization of certain of said cores in the direction reverse to said initial state in accordance with the negation of said particular condition and means for applying an activating pulse to said activating windings in series for restoring said initial state of magnetization in said certain cores, whereby said activating pulse is only applied to said load means corresponding to said particular condition.

5. A pulse switching circuit comprising a plurality of magnetic cores, a set winding, an activating winding, and an output winding on each of said cores, means connecting said activating windings in series, means connecting one end of each of said output windings to the last of said series activating windings, load means connected to the other end of each of said output windings, means including said set windings for reversing the state of magnetization of each of said cores in accordance with a particular condition, and means for applying an activating pulse to said activating windings in series to restore the initial state of magnetization of said cores, the number of turns of said output windings being sufficient that the flux change in said cores whose state of magnetization is restored induces a counterelectromotive force in said output windings sufficiently large to prevent passage of said activating pulse through said output windings to the load means connected thereto.

6. An electrical circuit comprising a plurality of magnetic cores, a plurality of windings on each of said cores, said windings including a set winding, an activating winding, and an output winding, means connecting said activating windings in series, means connecting one end of each of said output windings to the last of said series activating windings, load means connected to each of said output windings, means for applying a current pulse to certain of said load means, said pulse applying means including means for applying an information pulse for determining the magnetization of certain of said cores in one direction and means for applying an activating pulse to said activating windings in series to determine the magnetization of said certain cores in the other direction, and means for preventing the application of current pulses to other than said certain of said load means on the continued application of said activating pulse after the magnetization of said certain cores has been determined in the other direction, said last mentioned means including another magnetic core having a set winding, an output winding, and an activating winding, said another core activating winding being connected in series with the other activating windings and said another core output winding being connected in parallel with the other output windings, means applying an information pulse to said another core set winding whenever the magnetization of any of said cores is determined in said one direction and means directly connecting said another core output winding to ground.

7. An electrical circuit comprising at least two magnetic cores each including a set, an activating, and an output winding, a plurality of other magnetic cores each including a set, an activating, and a pair of output windings, means connecting said activating windings in series, means connecting one end of each of said first mentioned core output windings to the last of said series activating windings, and means connecting one output winding of each of said second mentioned cores in parallel to the other end of one of said first mentioned core output windings and connecting the other output winding of each of said second mentioned cores in parallel to the other end of the other of said first mentioned core output windings.

8. An electrical circuit in accordance with claim 7 wherein each of said second mentioned magnetic cores comprises at least two set windings.

9. An electrical circuit in accordance with claim 7 further comprising an output load connected to each of said output windings of said second mentioned magnetic cores and means applying an activating pulse to said series connected activating windings, said activating pulse appearing as an output pulse at certain of said output loads depending on the magnetic condition of said first and second mentioned cores.

10. An electrical circuit comprising a plurality of magnetic cores each having a plurality of windings thereon, load means connected to one winding of each of said cores, means for applying a current pulse to certain of said load means, said pulse applying means including means for determining the magnetization of the other of said cores in one direction and means for applying an activating pulse to a winding of said cores to reverse the magnetization of said other cores, and means for preventing the application of current pulses to other than said certain of said load means on the continued application of said activating pulse after the magnetization of said other cores has been reversed, said last-mentioned means including another magnetic core having a plurality of windings thereon including a set winding and an output winding, means applying an information pulse to said another core set winding whenever the magnetization of any of said plurality of cores is determined in said one direction, means directly connecting said another core output winding to ground, and means applying said activating pulse to a winding of said another core.

11. An electrical circuit including a plurality of magnetic cores each having a plurality of windings thereon, load means connected to one winding of each of said cores, means for applying a current pulse to certain of said load means dependent on the magnetization of said cores, said last-mentioned means including means applying an activating pulse to a winding of said cores, and means for limiting the duration of said current pulse applied to said certain load means, said last-mentioned means including another magnetic core having a plurality of windings thereon including an output winding connected to ground, means for determining the magnetization of said another core in one direction, and means applying said activating pulse to a winding of said another core to determine the magnetization of said another core in the reverse direction.

12. An electrical circuit including a magnetic core having a plurality of windings thereon, load means connected to one winding of said core, means for applying a current pulse to said load means dependent upon the magnetization of said core, said last-mentioned means including means for applying an activating pulse to a winding of said core, and means for limiting the duration of said current pulse applied to said output means, said last-mentioned means including another magnetic core having a plurality of windings thereon including an output winding connected to ground, means for determining the magnetization of said another core in one direction, and means applying said activating pulse to a winding of said another core to determine the magnetization of said another core in the reverse direction.

References Cited in the file of this patent

UNITED STATES PATENTS

| | | |
|---|---|---|
| 2,021,099 | Fitzgerald | Nov. 12, 1935 |
| 2,614,169 | Cohen et al. | Oct. 14, 1952 |
| 2,654,080 | Browne Jr. | Sept. 29, 1953 |
| 2,679,551 | Newby | May 25, 1954 |